(12) United States Patent
Yoshida et al.

(10) Patent No.: US 11,485,367 B2
(45) Date of Patent: Nov. 1, 2022

(54) DRIVER MONITORING SYSTEM AND DRIVER MONITORING METHOD

(71) Applicant: TOYOTA JIDOSHA KABUSHIKI KAISHA, Toyota (JP)

(72) Inventors: Tomoyuki Yoshida, Nisshin (JP);
Takanori Kusakabe, Gotemba (JP);
Kenichiroh Hara, Yokohama (JP);
Naoki Nishimura, Tokyo-to (JP);
Shunichiroh Sawai, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/363,160

(22) Filed: Jun. 30, 2021

(65) Prior Publication Data
US 2022/0001874 A1    Jan. 6, 2022

(30) Foreign Application Priority Data
Jul. 1, 2020 (JP) .............................. JP2020-114153

(51) Int. Cl.
*G08B 23/00* (2006.01)
*B60W 40/08* (2012.01)
(Continued)

(52) U.S. Cl.
CPC ............ *B60W 40/08* (2013.01); *B60W 40/04* (2013.01); *B60W 50/14* (2013.01);
(Continued)

(58) Field of Classification Search
CPC ...... B60W 40/08; B60W 40/04; B60W 50/14; B60W 60/0057; B60W 2040/0818; B60W 2050/143; B60W 2050/146; B60W 2540/223; B60W 2540/229; B60W 2556/45; B60W 60/0059; B60W 2554/4041; B60W 40/09
(Continued)

(56) References Cited

U.S. PATENT DOCUMENTS

| 10,579,056 B2 * | 3/2020 | Matrsumura ......... B60W 50/082 |
| 2018/0194280 A1 * | 7/2018 | Shibata .............. G01C 21/3484 |

(Continued)

FOREIGN PATENT DOCUMENTS

WO     2017168541 A1     10/2017

*Primary Examiner* — Anh V La
(74) *Attorney, Agent, or Firm* — Dickinson Wright, PLLC

(57) ABSTRACT

A driver monitoring system includes an automated driving controller that allows hands-off operation in which a driver releases hands from a steering wheel of a vehicle, and controls an automated steering driving in which the vehicle is automatically steered, and a request notification controller that notifies a hands-on request for prompting the driver of the vehicle to perform a hands-on operation to hold the steering wheel, or a surrounding confirmation request for prompting the driver to perform a surrounding confirmation operation to confirm a surrounding condition. During the automated steering driving, the request notification controller is configured to notify the hands-on request or the surrounding confirmation request again when an elapsed time from notification of the hands-on request or the surrounding confirmation request exceeds a criterion time.

8 Claims, 17 Drawing Sheets

(51) Int. Cl.
*B60W 60/00* (2020.01)
*B60W 50/14* (2020.01)
*B60W 40/04* (2006.01)

(52) U.S. Cl.
CPC . *B60W 60/0057* (2020.02); *B60W 2040/0818* (2013.01); *B60W 2050/143* (2013.01); *B60W 2050/146* (2013.01); *B60W 2540/223* (2020.02); *B60W 2540/229* (2020.02); *B60W 2556/45* (2020.02)

(58) Field of Classification Search
USPC .......................... 340/576, 575, 439, 438, 988
See application file for complete search history.

(56) References Cited

U.S. PATENT DOCUMENTS

| | | | |
|---|---|---|---|
| 2019/0072957 A1* | 3/2019 | Fujimura | G05D 1/0061 |
| 2019/0092346 A1 | 3/2019 | Odate et al. | |
| 2020/0207354 A1* | 7/2020 | Ishioka | B60W 10/18 |

\* cited by examiner

DRIVER MONITORING SYSTEM AND DRIVER MONITORING METHOD

CROSS-REFERENCE TO RELATED APPLICATION

The present application claims priority under 35 U.S.C. § 119 to Japanese Patent Application No. 2020-114153, filed Jul. 1, 2020, the contents of which application are incorporated herein by reference in their entirety.

BACKGROUND

Field

The present disclosure relates to a driver monitoring system and, in particular, to a driver monitoring system that monitors a driver during automated steering driving in which a vehicle is automatically steered.

Background

International Publication No. WO2017/168541 discloses a technique relating to an automated driving controller that automatically controls steering and acceleration/deceleration of a vehicle. In this technique, automatic control of the vehicle is performed in a "hands-off" condition where the driver does not touch the steering wheel.

SUMMARY

Consider a case where a "hands-off" condition is allowed for a driver of a vehicle in automated driving, as in the technique of International Publication No. WO2017/168541. The hands-off driver does not need to steer the vehicle, but has the obligation to monitor the vehicle's surroundings. However, if the hands-off condition continues for a long time, the driver's attention to driving may gradually decrease.

The present disclosure has been made in view of the above-described problems, and an object thereof is to provide a technique capable of suppressing a decrease in attention of a driver to driving in an automated steering driving in which the vehicle is automatically steered.

In order to solve the above problems, a driver monitoring system according to a first disclosure includes an automated driving controller that allows hands-off operation in which a driver releases hands from a steering wheel of a vehicle, and controls an automated steering driving in which the vehicle is automatically steered, and a request notification controller that notifies a hands-on request for prompting the driver of the vehicle to perform a hands-on operation to hold the steering wheel, or a surrounding confirmation request for prompting the driver to perform a surrounding confirmation operation to confirm a surrounding condition. During the automated steering driving, the request notification controller is configured to notify the hands-on request or the surrounding confirmation request again when an elapsed time from notification of the hands-on request or the surrounding confirmation request exceeds a criterion time.

A second disclosure has the following further features in the first disclosure.

The driver monitoring system includes a steering touch sensor for detecting a steering information of the steering wheel. During the automated steering driving, the request notification controller is configured to reset the elapsed time when an execution of the hands-on operation is determined based on the steering information.

A third disclosure has the following further features in the first disclosure.

The driver monitoring system includes a driver monitor for monitoring a status of the driver of the vehicle. During the automated steering driving, the request notification controller is configured to reset the elapsed time when an execution of the surrounding confirmation operation is determined based on the driver monitor information obtained from the driver monitor.

A fourth disclosure has the following features in the first third disclosure.

The driver monitoring system further includes information acquisition equipment to acquire vehicle surrounding information of the vehicle. During the automated steering driving, the request notification controller is configured to execute criterion time setting control for setting the criterion time in accordance with the vehicle surrounding information detected by the information acquisition equipment.

A fifth disclosure has the following features in the fourth disclosure.

The vehicle surrounding information includes information about a preceding vehicle of the vehicle. In the determination reference time setting control, the request notification controller is configured to set the criterion time longer when the preceding vehicle exists than when the preceding vehicle does not exist.

A sixth disclosure has the following features in the fourth disclosure.

The vehicle surrounding information includes surrounding environment information transmitted from a road-side machine. In the criterion time setting control, the request notification controller is configured to set the criterion time to be longer when the surrounding environment information includes alert information to urge the driver to pay attention.

A seventh disclosure has the following features in the fourth disclosure.

The vehicle surrounding information includes map information. The map information includes information relating to an alert section to urge the driver to pay attention. In the criterion time setting control, the request notification controller is configured to set the criterion time to be longer when the current position of the vehicle belongs to the alert section than when the current position does not belong to the alert section.

An eighth disclosure has the following features in the fourth disclosure.

The automated driving controller is configured to execute a driver warning control for providing a warning to the driver when an indication related to a decrease in a driver's attention is detected. In the criterion time setting control, when the warning is performed by the driver warning control, the request notification controller is configured to set the criterion time to be shorter than before the warning is performed.

A ninth disclosure has the following features in the fourth disclosure.

In the criterion time setting control, the request notification controller is configured to notify the driver of a reason for change when the criterion time is changed.

A tenth disclosure is directed to a driver monitoring method applied to a vehicle. The vehicle includes an automated driving controller that allows hands-off operation in which a driver releases hands from a steering wheel of the vehicle, and controls an automated steering driving in which the vehicle is automatically steered, and a request notification controller that notifies a hands-on request for prompting the driver of the vehicle to perform a hands-on operation to hold the steering wheel, or a surrounding confirmation request for prompting the driver to perform a surrounding confirmation operation to confirm a surrounding condition. The driver monitoring method includes a process of, during the automated steering driving, notifying the hands-on request or the surrounding confirmation request again when an elapsed time from notification of the hands-on request or the surrounding confirmation request exceeds a criterion time.

According to the first disclosure, it is possible to periodically notify the driver of a hands-on request or a surrounding confirmation request during the automated steering driving. As a result, it is possible to suppress a decrease in the attention of the driver who is performing the hands-off operation.

According to the second disclosure, when the hands-on operation by the driver is performed during the automated steering driving, the elapsed time is reset. This makes it possible to extend the time until the hands-on request or the surrounding confirmation request is notified again to a driver who is considered to have attention.

According to the third disclosure, when the surrounding confirmation operation by the driver is performed during the automated steering driving, the elapsed time is reset. This makes it possible to extend the time until the hands-on request or the surrounding confirmation request is notified again to a driver who is considered to have attention.

When the interval for notifying the hands-on request or the surrounding confirmation request is shortened, the driver's attention is prevented from decreasing, but the driver feels much troublesome. According to the fourth disclosure, the interval for notifying the hands-on request or the surrounding confirmation request can be optimized based on the vehicle surrounding information.

In particular, according to the fifth disclosure, it is possible to increase the attention of the driver in the presence of the preceding vehicle and reduce the troublesome of the driver in the absence of the preceding vehicle.

Further, according to the sixth disclosure, it is possible to enhance the driver's attention when the alert information is included in the surrounding environment information, and to reduce the driver's trouble when the alert information is not included in the surrounding environment information.

Further, according to the seventh disclosure, it is possible to enhance the attention of the driver when the current position belongs to the alert section, and to reduce the troublesomeness of the driver when the current position does not belong to the alert section.

According to the eighth disclosure, when a warning by the driver warning control is performed, the interval for notifying the hands-on request or the surrounding confirmation request can be shortened in preparation for the driver's attention level to be lowered again.

According to the ninth disclosure, when the criterion time is changed, the driver is notified of the reason for the change. As a result, the sense of discomfort felt by the driver can be reduced.

Thus, according to the present disclosure, in the automated steering driving in which the steering of the vehicle is performed automatically, it is possible to suppress a decrease in the attention of the driver to the driving.

DETAILED DESCRIPTION

Hereinafter, embodiments of the present disclosure will be described with reference to the accompanying drawings. However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiment is not necessarily essential to the present disclosure unless explicitly described otherwise, or unless the present disclosure is explicitly specified by the structures, steps or the like theoretically.

1. First Embodiment 1-1. Summary of Driver Monitoring System 10

Figure 1:
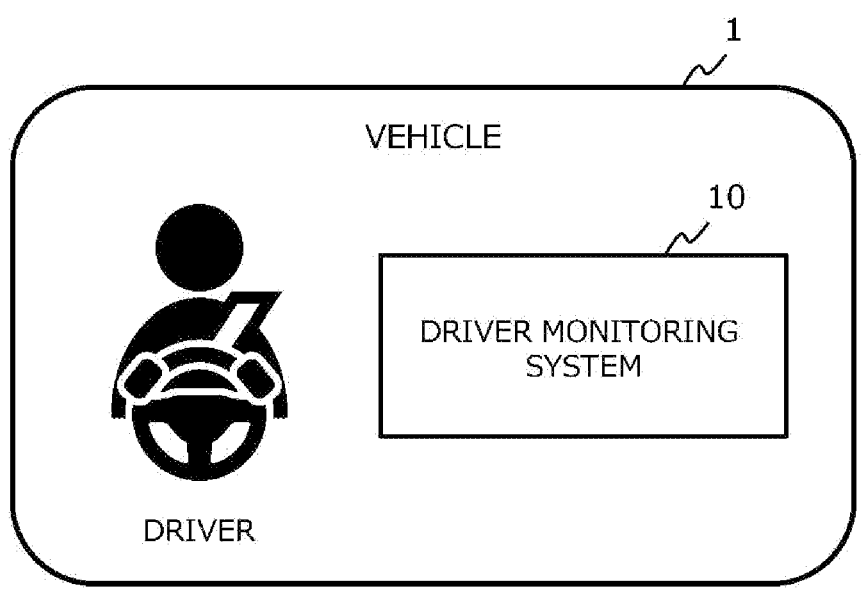
FIG. 1 is a conceptual diagram for explaining an outline of a driver monitoring system according to a first embodiment.

FIG. 1 is a conceptual diagram for explaining an outline of a driver monitoring system according to a first embodiment. A driver monitoring system 10 is mounted on a vehicle 1, and controls the operation of the vehicle 1. More particularly, the driver monitoring system 10 includes an automated driving controller and a request notification controller. The automated driving controller executes, at least, an automated steering driving in which a steering of the vehicle 1 is automatically controlled. Basically, during the automated steering driving, the driver of the vehicle 1 is allowed to release his/her hands from the steering wheel. In the following description, the situation in which the driver of the vehicle 1 is holding the steering wheel is referred to as "hands-on", and the situation in which the driver is releasing the hands from the steering wheel is referred to as "hands-off". In addition, the automated steering driving with hands-off is hereinafter referred to as "hands-off automated driving."

When the hands-off automated driving continues for a long time, the driver's attention to driving may gradually decrease. As this countermeasure, the request notification controller execute request notification control that periodically (e.g., every 10 minutes) notifies the driver of the vehicle 1 of a request to "hands-on" during the hands-off automated driving. This request is hereinafter referred to as a "hands-on request". In the hands-on request, for example, the request notification controller displays a hands-on request in a HUD (Head Up Display) or a MID (Multi Information Display) of the vehicle 1. Alternatively, the request notification controller outputs voice guidance or warning sound from a speaker of the vehicle to the driver. According to such a control, it is possible to suppress a decrease in the driving consciousness by increasing the attention of the driver during the hands-off automated driving.

In the request notification control, instead of the hands-on request, it may be notified periodically surrounding confirmation request prompting to confirm prescribed surrounding confirmation points to the driver of the vehicle 1 in order by the driver's visual. The surrounding confirmation points in this case, vehicle front, meter, room mirror, outer mirror, blind spot, etc. are exemplified. The surrounding confirmation request is considered to be less troublesome to the driver than the hands-on request. Therefore, according to the request notification control that perform the surrounding confirmation request, it is possible to increase the driver's attention during the hands-off automated driving while reducing the troublesome to give to the driver.

1-2. Configuration Example of Vehicle Controller

Figure 2:
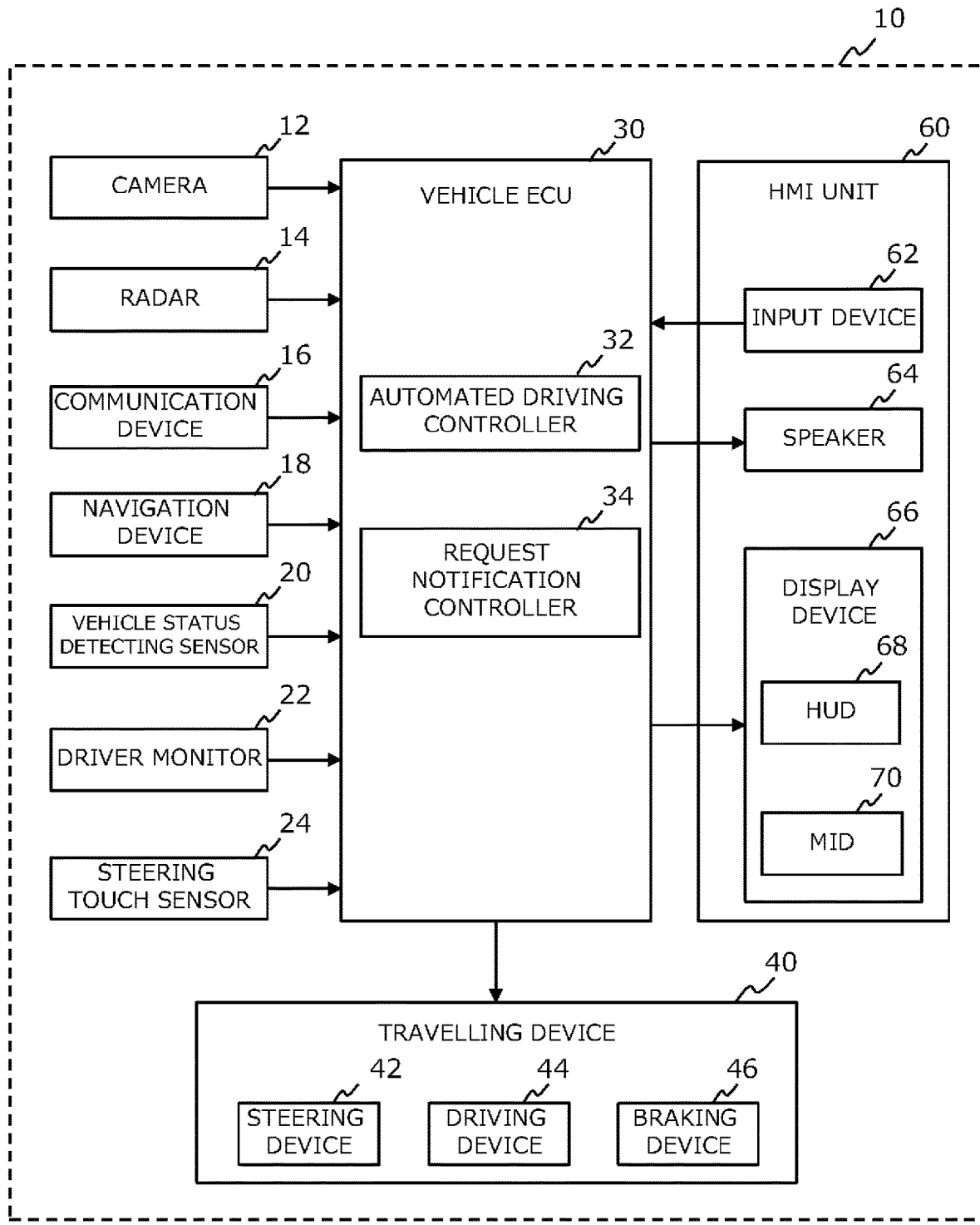
FIG. 2 is a diagram showing a schematic configuration of the driver monitoring system according to the first embodiment.

Next, a configuration example of the driver monitoring system that executes the above-mentioned request notification control will be described. FIG. 2 is a diagram showing a schematic configuration of the driver monitoring system according to the first embodiment. The driver monitoring system 10 shown in FIG. 2 is mounted on the vehicle 1.

As shown in FIG. 2, the driver monitoring system 10 includes a vehicle ECU (Electronic Control Unit) 30 mounted on the vehicle 1. Further, the driver monitoring system 10 includes a camera 12, a radar 14, a communication device 16, a navigation device 18, a vehicle state detecting sensor 20, a driver monitor 22 and a steering touch sensor 24 as information acquisition equipment connected to an input-side of the vehicle ECU 30. Further, the driver monitoring system 10 includes a traveling device 40 which is connected to an output-side of the vehicle ECU 30, and an HMI unit 60.

The camera 12 acquires vehicle surrounding information of the vehicle 1, for example, a front camera for capturing an image of the front of the vehicle 1, left and right rear cameras for capturing an image of the left and right rear of the vehicle 1. The image captured by the camera 12 is transmitted as image data to the vehicle ECU 30 at any time, and is performed image processing on each image data in the vehicle ECU 30. The vehicle surrounding information acquired by the camera 12 is road information such as position information of the surrounding vehicles traveling around the vehicle 1, white line information, and signal information, for example.

The radar 14 is, for example, a laser radar or a millimeter-wave radar or the like, and acquires the vehicle surrounding information of the vehicle 1. The radar 14 sends out laser waves or the like in front of and behind the vehicle 1, and receives the reflected waves to acquire the vehicle surrounding information of the vehicle 1. The vehicle surrounding information acquired by the radar 14 is, for example, information on the presence or absence of surrounding vehicles, distance, angle (i.e., relative position) and speed (relative speed) from surrounding vehicles, and location information of utility poles and buildings. Each information detected by the radar 14 is transmitted to the vehicle ECU 30 at any time.

The communication device 16 receives surrounding environment information of the vehicle 1 via an antenna provided in the vehicle 1 from a road-side machine provided on the road. The road-side machine is a beacon device that transmits, for example, weather information, traffic congestion information, traffic information by lane, regulation information such as pauses, traffic situation information at a blind spots, and the like. As the communication device 16, for example, a road-traffic-information communication system (e.g., VICS™): Vehicle Information and Communication System) or the like is exemplified. The surrounding environment information received by the communication device 16 is transmitted to the vehicle ECU 30 at any time.

The navigation device 18 detects a current position of the vehicle 1 via the antenna from a GPS satellite, and also uses GPS, speed sensors and gyroscopes to detect the traveling speed of the vehicle 1 and guide the route to the destination. The navigation device 18 incorporates map information including detailed road information. The map information includes, for example, information on the shape of the road, the number of lanes, the lane width, and the like. The information on the current position and road information acquired by the navigation device 18 is transmitted to the vehicle ECU 30 at any time.

The vehicle state detecting sensor 20 detects a traveling state of the vehicle 1. As the vehicle state detecting sensor 20, a vehicle speed sensor, a lateral acceleration sensor, a yaw rate sensor or the like is exemplified. The information detected by the vehicle state detecting sensor 20 is transmitted to the vehicle ECU 30.

The driver monitor 22 is for monitoring a state of the driver driving the vehicle 1. The state of the driver detected here includes, for example, a line of sight of the driver, a heartbeat state, a breathing state, and the like. The line of sight of the driver is grasped, for example, by photographing the driver itself from a camera installed in the vehicle 1. The heartbeat state of the driver is grasped by detecting the heartbeat rate of the driver holding the steering wheel, for example, by an electrode incorporated in the steering wheel. Further, the breathing state of the driver is grasped by observing a change in the detection value of the load sensor incorporated in the seat on which the driver sits.

The steering touch sensor 24 is used to detect steering holding information indicating whether the driver is performing a hands-on operation or a hands-off operation. The steering holding information detected by the steering touch sensor 24 is transmitted to the vehicle ECU 30 at any time.

The traveling device 40 is configured to include a steering device 42, a driving device 44, and a braking device 46. The steering device 42 steers wheels of the vehicle 1. For example, the steering device 42 includes an electric power steering (EPS) device. The driving device 44 is a power source for generating a driving force. As the driving device 44, an engine, an electric motor, an in-wheel motor or the like is exemplified. The braking device 46 generates a braking force.

The HMI unit 60 is an interface for providing information to the driver of the vehicle 1 and receiving information from the driver. For example, the HMI unit 60 includes an input device 62, a speaker 64 and a display device 66. Examples of the input device 62 include a touch panel, a keyboard, switches, and buttons. The driver can input information such as a destination to the HMI unit 60 using the input device 62. The information input from the drivers is transmitted to the vehicle ECU 30 at any time. The speaker 64 provides audio information to the driver. The display device 66 provides visual information to the driver. The display device 66 is exemplified by a HUD (Head Up Display) 68 or a MID (Multi Information Display) 70.

1-3. Functions of Vehicle ECU

The vehicle ECU 30 is configured to include an automated driving controller 32 and a request notification controller 34. The automated driving controller 32 is an electronic control unit that performs "automated driving control" to automatically travel the vehicle 1. Typically, the automated driving controller 32 is a microcomputer including a processor, a memory, and an input/output interface. The automated driving controller 32 receives information necessary for automated driving control from various information acquisition equipment via the input/output interface. The automated driving controller 32 executes the automated driving control based on the received information. Specifically, the automated driving controller 32 formulates a travel plan of the vehicle 1, and outputs information to the traveling device 40 so that the vehicle 1 travels according to the travel plan. The operation implemented by the automated driving control performed by the automated driving controller 32 includes an automated steering driving in which at least the steering of the vehicle 1 is performed automatically. The automated driving controller 32 acquires automated driving information including whether the automated steering driving is executed at any time, and stores the information in the memory.

A known technique is applied to the automated driving control executed by the automated driving controller 32. Therefore, the description of the functions of the automated driving controller 32 associated with the automated driving control is not omitted or simplified.

Figure 3:
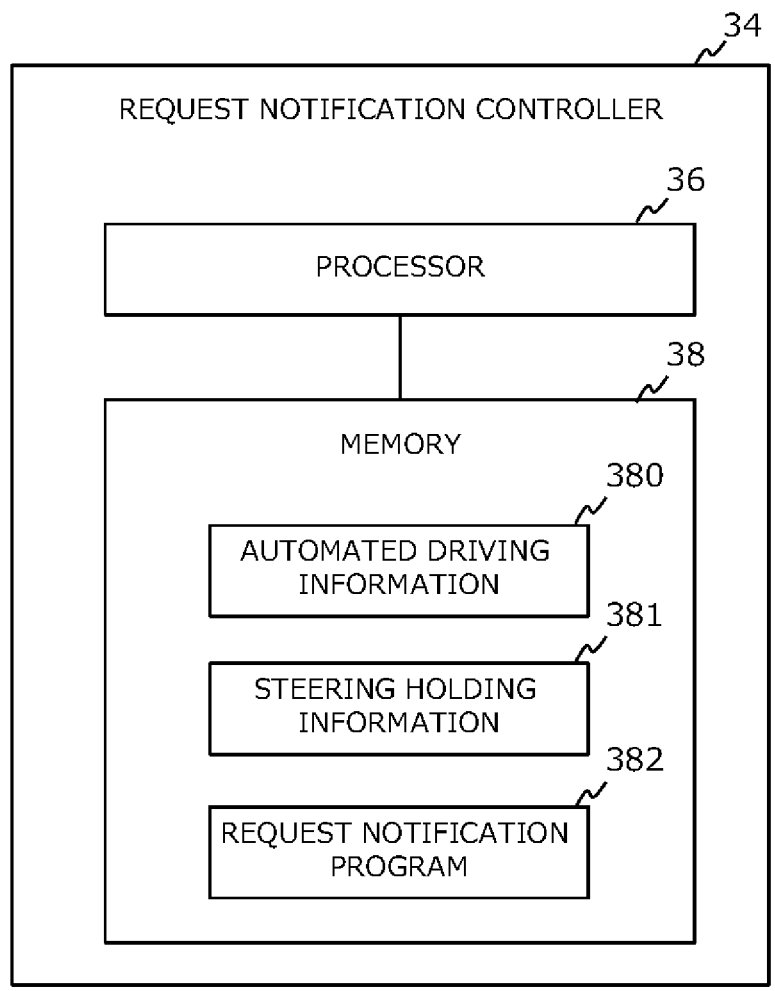
FIG. 3 is a block diagram showing a configuration example of a request notification controller according to the first embodiment.

The request notification controller 34 is an electronic control unit that performs "request notification control" to periodically notify the hands-on request to the driver of the vehicle 1 during the hands-off automated driving. FIG. 3 is a block diagram showing a configuration example of the request notification controller according to the first embodiment. The request notification controller 34 is, for example, a microcomputer. The request notification controller 34 is also called an ECU. The request notification controller 34 includes a processor 36 and a memory 38.

Various kinds of information are stored in the memory 38. As the memory 38, a volatile memory, a non-volatile memory, or the like is exemplified. As the information stored in the memory 38, automated driving information 380 obtained from the automated driving controller 32, steering holding information 381 obtained from the steering touch sensor 24, and the like are exemplified. The processor 36 executes a computer program. The computer program is stored in the memory 38 or recorded on a computer-readable recording medium. The program stored in the memory 38 includes a request notification program 382 for "request notification control", for example. The request notification control is realized by the processor 36 executing the request notification program 382.

1-4. Request Notification Control

Figure 4:
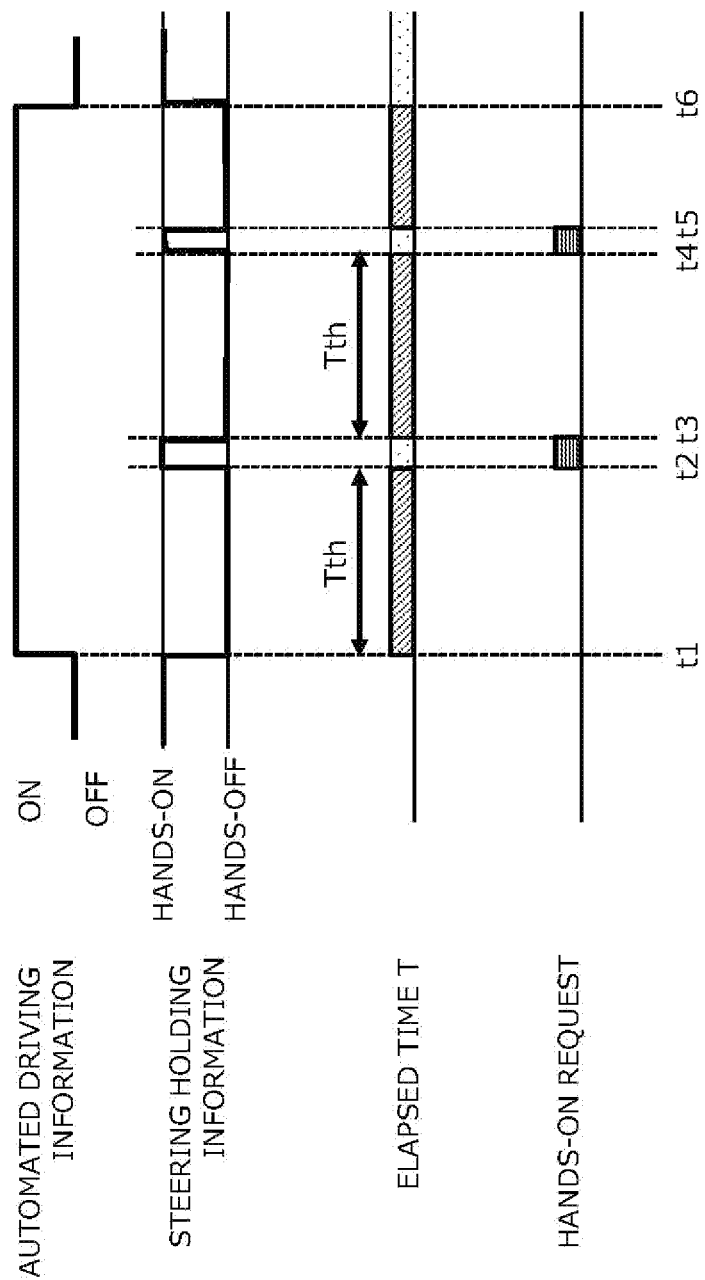
FIG. 4 is a timing chart for explaining an example of request notification control executed by the driver monitoring system according to the first embodiment.

The driver monitoring system 10 according to the first embodiment executes request notification control to periodically notify the hands-on request to the driver during the hands-off automated driving. FIG. 4 is a timing chart for explaining an example of request notification control executed by the driver monitoring system 10 according to the first embodiment. Hereinafter, the request notification control will be described in detail with reference to FIG. 4.

When the hands-off automated driving is started at time t1 shown in FIG. 4, the request notification controller 34 calculates an elapsed time T from the time t1 of the hands-off automated driving. When the elapsed time T exceeds the predetermined criterion time Tth at time t2, the hands-on request is notified to the driver. The criterion time Tth here is, for example, 10 minutes. Thereafter, when continuous steering by the driver for a predetermined period of time, e.g., 4 seconds, is detected at time t3, the request notification controller 34 withdraws the hands-on request and resets the elapsed time T to zero. Then, when the elapsed time T exceeds the criterion time Tth again at the time t4, the driver is notified of the hands-on request again. When continuous steering by the driver for a predetermined period of time is detected at time t5, the request notification controller 34 withdraws the hands-on request and resets the elapsed time T to zero. When the hands-off automated driving is terminated at a time t6 before the elapsed time T exceeds the criterion time Tth, the steering wheel is held by the driver, and the elapsed time T is reset to zero again.

According to the request notification control as described above, to the driver during the hands-off automated driving, it is possible to urge the operation for improving the driving consciousness periodically.

1-5. Specific Process of Request Notification Control of First Embodiment

Figure 5:
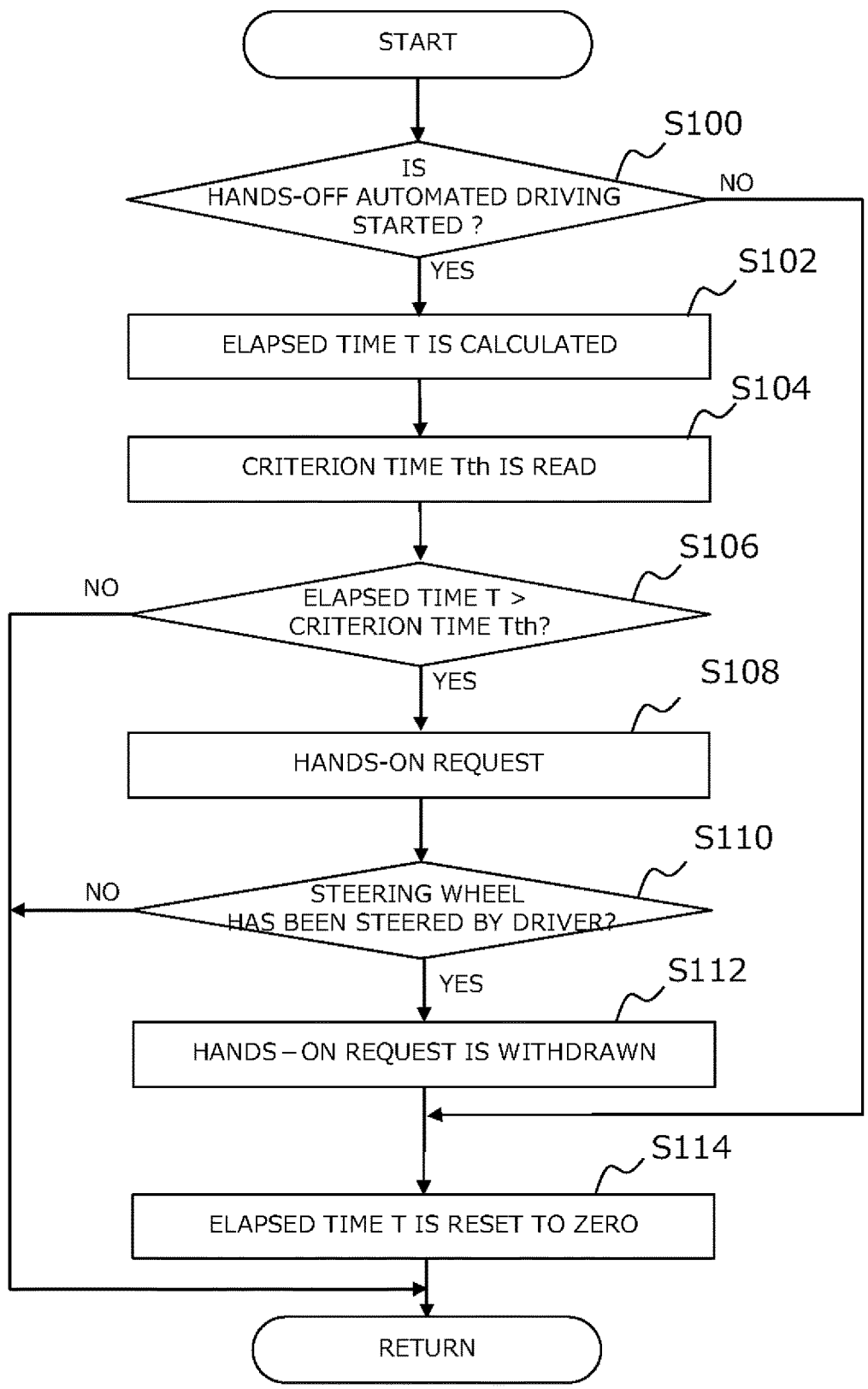
FIG. 5 is a flowchart illustrating a routine of request notification control executed in the first embodiment.

Next, a specific process of the request notification control executed in the driver monitoring system 10 according to the first embodiment having the above-described configuration will be described with reference to a flowchart. FIG. 5 is a flowchart illustrating a routine of request notification control executed in the first embodiment. The routine shown in FIG. 5 is repeatedly executed in the processor 36 of the request notification controller 34 at a predetermined control cycle, for example, 0.1 sec.

When the routine shown in FIG. 5 is started, first, in step S100, it is determined whether the hands-off automated driving has been started or not. Here, based on the automated driving information 380 and the steering holding information 381, it is determined whether the vehicle 1 is in the middle of hands-off automated driving. As a result, when the vehicle 1 is not in the middle of hands-off automated driving, it is determined that the hands-on request is unnecessary. Then the process proceeds to step S114 where the elapsed time T is reset to zero. When the process of step S114 is completed, the routine is terminated.

On the other hand, when the vehicle 1 is in the middle of hands-off automated driving, the process proceeds to step S102. In step S102, the elapsed time T is calculated. In the following step S104, the criterion time Tth is read. For example, a predetermined fixed value (e.g., 10 minutes) is read as the criterion time Tth.

In the following step S106, it is determined whether the elapsed time T is larger than the criterion time Tth. As a result, when the elapsed time T is equal to or less than the criterion time Tth, it is determined that the hands-on request is unnecessary. In this case, the routine is terminated.

On the other hand, when the elapsed time T exceeds the criterion time Tth, the process proceeds to step S108. In step S108, the driver of the vehicle 1 is notified of a hands-on request. Examples of the hands-on request here include a request for displaying icons on a HUD 68 or a MID 70, a request for audio guidance from the speaker 64, and the like.

In the following step S110, based on the steering holding information 381, it is determined whether the steering wheel has been steered by the driver for a specified time continuously (e.g., 4 seconds). As a result, when the steering wheel has not been steered by the driver for the specified time, the routine is terminated and the routine is executed again. On the other hand, in step S110, when the steering wheel has been steered by the driver for the specified time, the process proceeds to step S112.

In step S112, the hands-on request is withdrawn. As a result, the display of the icon to the HUD 68 or the MID 70, audio guidance from the speaker 64, or the like is terminated. When the process of step S112 is completed, the process proceeds to step S114. In step S114, the elapsed time T is reset to zero. When the process of step S114 is completed, the routine is terminated.

According to such a request notification control, since the hands-on request is notified periodically during the hands-off automated driving, it is possible to suppress a decrease in the attention of the driver.

1-6. Modified Example of First Embodiment

The driver monitoring system 10 of the present embodiment may adopt a modified form as described below.

The hands-on request executed in the request notification control may be replaced with a surrounding confirmation request that prompts the driver to confirm a surrounding condition of the vehicle 1. More specifically, the surrounding confirmation request is a request for prompting confirmation of the surroundings of the vehicle 1. Typically, the surrounding confirmation request prompts the driver to visually confirm prescribed surrounding confirmation points in turn. The surrounding confirmation points are exemplified vehicle front, meters, room mirrors, outer mirrors, blind spots, and the like. Generally, the surrounding confirmation request is less troublesome to the driver than the hands-on request.

Figure 6:
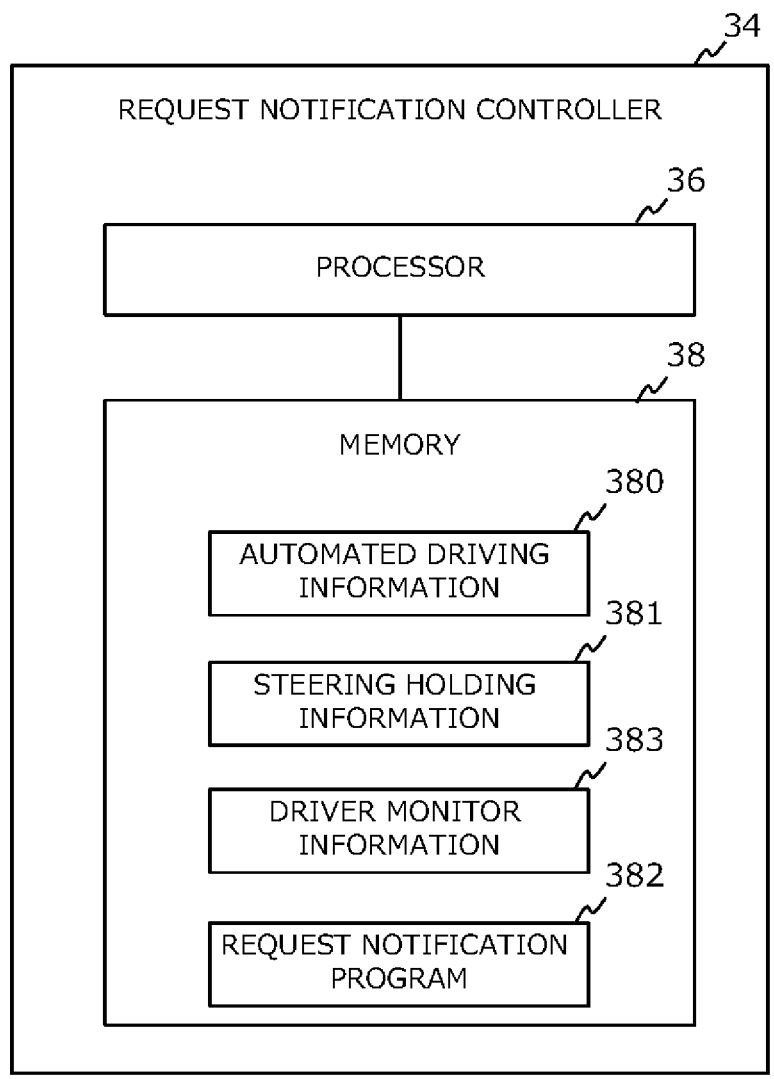
FIG. 6 is a block diagram showing a modified example of the request notification controller according to the first embodiment.

FIG. 6 is a block diagram showing a modified example of the request notification controller according to the first embodiment. Driver monitor information 383 is stored in the memory 38 of the request notification controller 34 as a modified example in addition to the above-described automated driving information 380, the steering holding information 381, and the request notification program 382. The driver monitor information 383 is information used to determine whether the driver of the vehicle 1 visually recognizes the surrounding confirmation points. The driver monitor information 383 includes, for example, line-of-sight information of the driver captured by the driver monitor 22.

When the surrounding confirmation request is made in the request notification control, the surrounding confirmation request may be made in place of the hands-on request in step S108 of the routine shown in FIG. 5. In this case, the execution confirmation of the surrounding confirmation of the step S110 may be determined based on, for example, the driver monitor information 383.

The selection of the hands-on request and the surrounding confirmation request in the request notification control is not limited. That is, as described above, the surrounding confirmation request is less troublesome for the driver than the hands-on request. In the request notification control, in order to reduce the troublesomeness of frequent notification of the hands-on request, these requests may be executed as appropriate, for example, by alternately executing the hands-on request and the surrounding confirmation request.

In addition, it is known that, if a state in which the line of sight of the driver is concentrated at one point continues, the attention decreases due to a decrease in driving consciousness. In order to suppress a decrease in the attention of the driver, it is effective to periodically scatter the line of sight of the driver. Therefore, the surrounding confirmation request may be replaced with a request for confirming the intentionally emitted light. In this case, in the surrounding confirmation request, for example, the driver may be prompted to confirm the light irradiated on the windshield or the like, and the driver monitor information 383 may be used to confirm whether or not it is executed.

2. Second Embodiment

Next, the driver monitoring system according to the second embodiment will be described.

2-1. Configuration of Driver Monitoring System According to Second Embodiment

The configuration of the driver monitoring system according to the second embodiment is the same as that of the driver monitoring system 10 according to the first embodiment shown in FIG. 2. Therefore, a detailed description of the driver monitoring system according to the second embodiment is omitted.

2-2. Functions of Driver Monitoring System According to Second Embodiment

In the driver monitoring system 10 according to the first embodiment described above, the hands-on request is periodically performed during the hands-off automated driving. The driver monitoring system 10 according to the second embodiment is characterized by the operation of extending the time until the next hands-on request is performed, when a voluntary hands-on operation by the driver is recognized during the hands-off automated driving.

Figure 7:
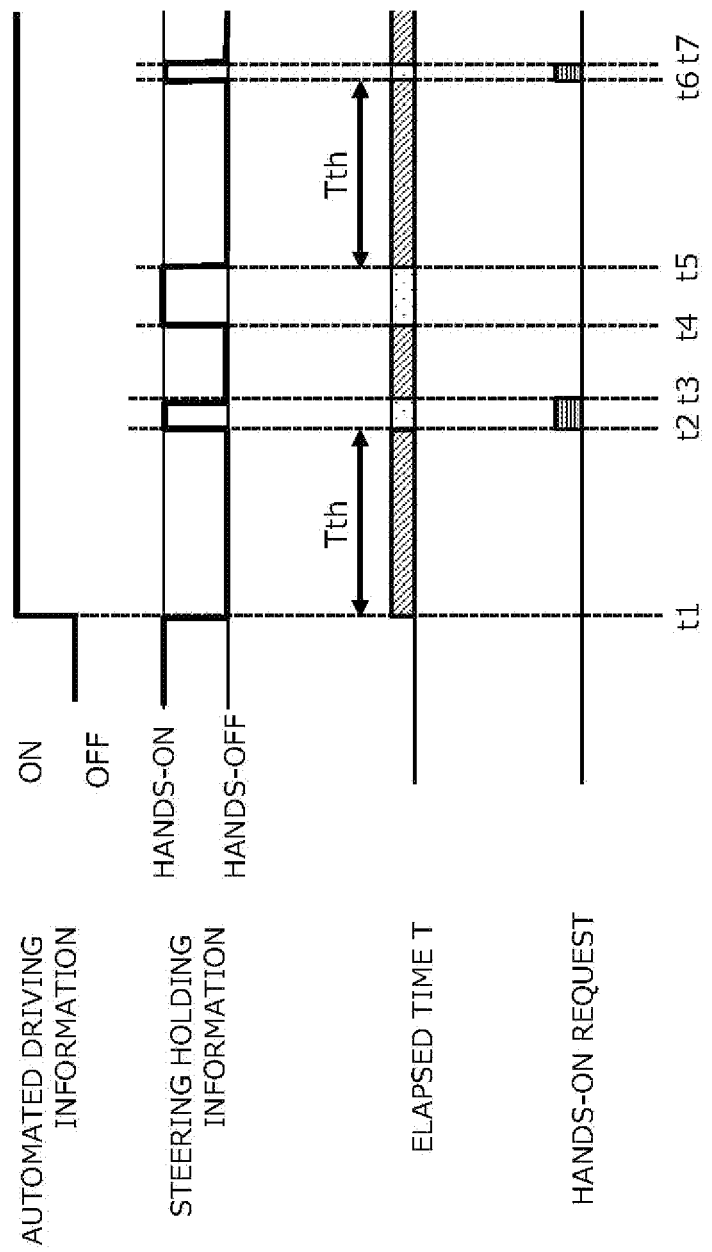
FIG. 7 is a timing chart for explaining an example of request notification control executed by the driver monitoring system according to a second embodiment.

FIG. 7 is a timing chart for explaining an example of request notification control executed by the driver monitoring system 10 according to the second embodiment. As shown in FIG. 7, when the hands-off automated driving is started at time t1, the request notification controller 34 calculates the elapsed time T from the time t1 of the hands-off automated driving. When the elapsed time T exceeds the predetermined criterion time Tth at time t2, a hands-on request is notified to the driver. The criterion time Tth here is, for example, 10 minutes. Then, when the steering by the driver for a predetermined period of time, e.g., 4 seconds, is detected at time t3, the request notification controller 34 withdraws the hands-on request, resets the elapsed time T to zero, and calculates the elapsed time T from time t3.

Here, it is assumed that the driver performs the hands-on operation voluntarily at time t4 before the elapsed time T reaches the criterion time Tth. When voluntary hands-on operation is performed, it is considered that the driver's consciousness for driving has been improved at that point. In such a case, if the hands-on request is notified based on the elapsed time T from the time t3, there is a possibility that the hands-on request is notified again immediately after the voluntary hands-on operation, and this is not necessarily a request for the driver whose attention is not deteriorated.

Therefore, in the driver monitoring system 10 of the second embodiment, when the voluntary hands-on operation is performed between the time t4 and the time t5, the hands-on request is notified to the driver again at the time t6, at which the elapsed time T from the time t5 at which the hands-off operation is performed again exceeds the criterion time Tth. Thereafter, when the steering by the driver for a predetermined period of time, e.g., 4 seconds, is detected at time t6, the request notification controller 34 withdraws the hands-on request and resets the elapsed time T to zero.

According to the request notification control as described above, it is possible to notify a hands-on request with an appropriate frequency in consideration of the voluntary hands-on operation by the driver during the hands-off automated driving.

2-3. Specific Process of Request Notification Control of Second Embodiment

Figure 8:
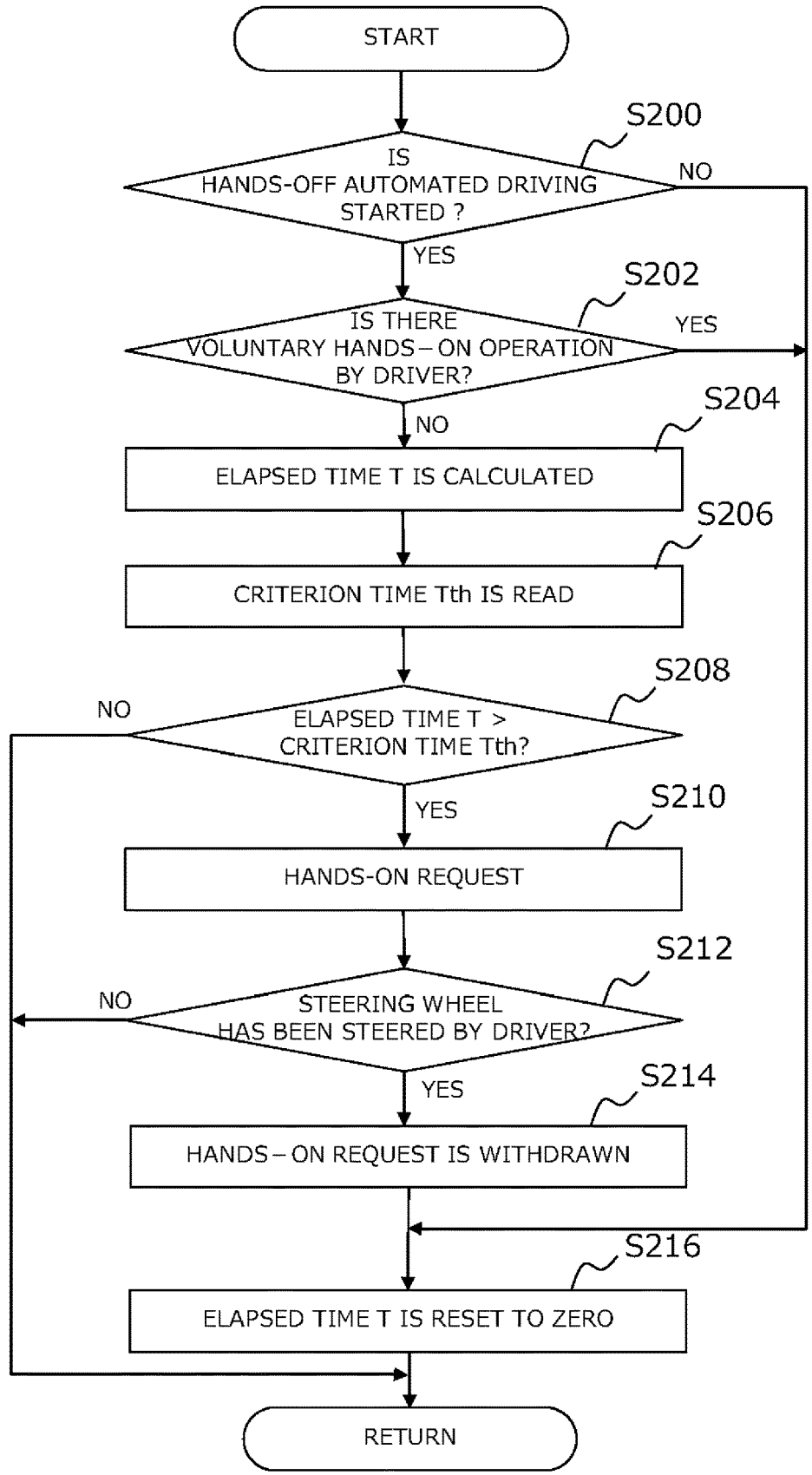
FIG. 8 is a flowchart illustrating a routine of request notification control executed in the second embodiment.

Next, a specific process of the request notification control executed in the driver monitoring system 10 according to the second embodiment having the above-described configuration will be described with reference to the flowchart. FIG. 8 is a flowchart illustrating a routine of request notification control executed in the second embodiment. The routine shown in FIG. 8 is repeatedly executed in the processor 36 of the request notification controller 34 at a predetermined control cycle, for example, 0.1 sec.

When the routine shown in FIG. 8 is started, first, in step S200, it is determined whether the hands-off automated driving has been started or not. Here, the same process as in step S100 of FIG. 5 is executed. As a result of the process of step S200, when the vehicle 1 is not in the middle of hands-off automated driving, it is determined that the hands-on request is unnecessary. Then the process proceeds to step S216 where the elapsed time T is reset to zero. When the process of step S216 is completed, the routine is terminated.

On the other hand, when the vehicle 1 is in the middle of hands-off automated driving, the process proceeds to step S202. In step S202, it is determined whether there has been a voluntary hands-on operation by the driver. Here, it is determined whether the driver has hold the steering for a predetermined period of time, e.g., 4 seconds, based on the steering holding information 381. As a result, when the hands-on operation by the drivers is permitted, the process proceeds to step S216 and the elapsed time T is reset to zero.

On the other hand, when the hands-on operation by the driver is not permitted, the process proceeds to step S204. In the process from step S204 to step S216, the same process is executed as in the process from step S102 to step S114 shown in FIG. 5.

According to the request notification control, when the driver performs the voluntary hands-on operation, the elapsed time T is reset to zero. This makes it possible to optimize the frequency of hands-on requests.

2-4. Modified Example of Second Embodiment

The driver monitoring system 10 of the present embodiment may adopt a modified form as described below.

The hands-on request executed in the process of step S210 may be replaced with a peripheral check request. In addition, the confirmation of the hands-on operation in the process of step S202 may be replaced with the confirmation of the surrounding confirmation operation. In this case, the request notification controller 34 may determine the presence or absence of the surrounding confirmation operation based on the driver monitor information 383, for example.

When the hands-on operation by the drivers is recognized in the process of step S202, the process of extending the criterion time Tth may be executed instead of the process of resetting the elapsed time T in step S216. Such processing also makes it possible to delay the timing of the hands-on request after the hands-on operation by the driver.

3. Third Embodiment

Next, the driver monitoring system according to the third embodiment will be described.

3-1. Configuration of Driver Monitoring System According to Third Embodiment

The configuration of the driver monitoring system according to the third embodiment is the same as that of the driver monitoring system 10 according to the first embodiment shown in FIG. 2. Therefore, a detailed description of the driver monitoring system according to the third embodiment is omitted.

3-2. Functions of Driver Monitoring System According to Third Embodiment

In the driver monitoring system 10 according to the first embodiment described above, the hands-on request is periodically performed during the hands-off automated driving. Here, during the hands-off automated driving, the degree of attention required to the driver is different depending on the surrounding environment of the vehicle 1. For example, when the preceding vehicle of the vehicle 1 exists during the hands-off automated driving, there is a high need to maintain a higher driving consciousness than when the preceding vehicle does not exist.

The driver monitoring system 10 according to the third embodiment is characterized by a criterion time setting control that sets the criterion time Tth according to the surrounding environment of the vehicle 1 during hands-off automated driving. The criterion time setting control of the third embodiment sets the criterion time Tth according to the information about the preceding vehicle included in the vehicle surrounding information of the vehicle 1.

Figure 9:
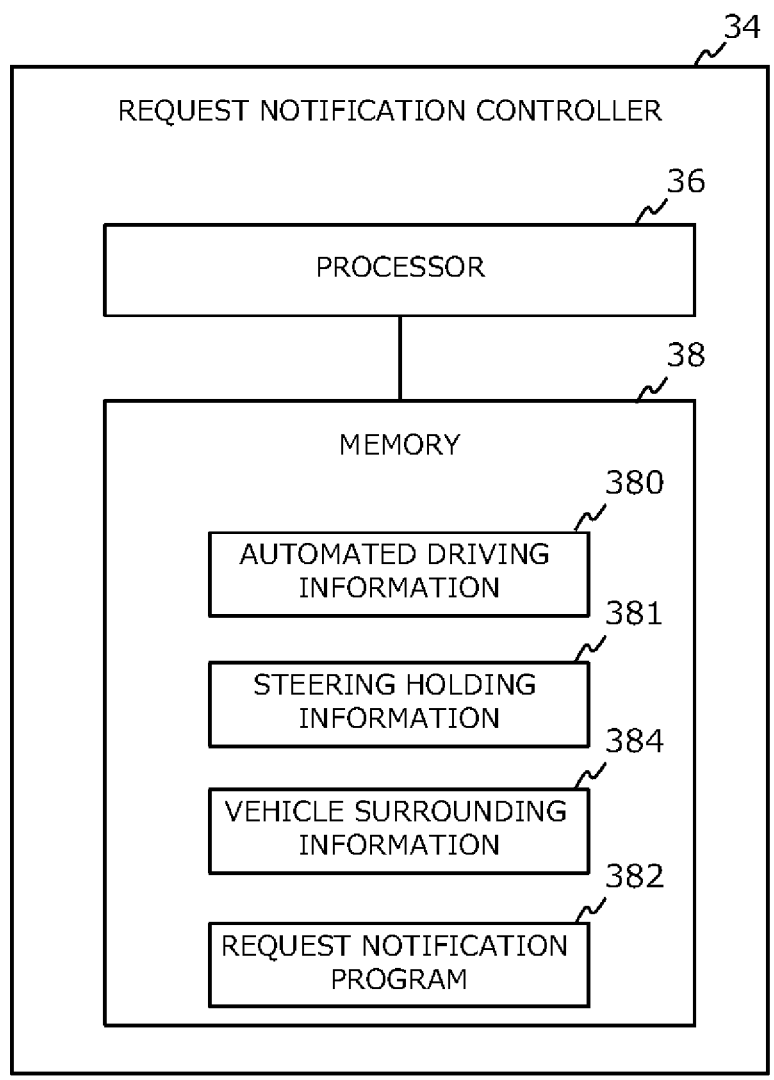
FIG. 9 is a block diagram showing a function of the request notification controller according to a third embodiment.

FIG. 9 is a block diagram showing the function of the request notification controller according to the third embodiment. The memory 38 of the request notification controller 34 according to the third embodiment stores vehicle surrounding information 384 in addition to the automated driving information 380, the steering holding information 381, and the request notification program 382 described above. The vehicle surrounding information 384 includes position information of the preceding vehicle traveling in front of the vehicle 1. The vehicle surrounding information 384 is acquired by the camera 12 or the radar 14. The request notification program 382 includes a program related to the criterion time setting control. When the processor 36 executes the request notification program 382, the criterion time setting control is realized.

Figure 10:
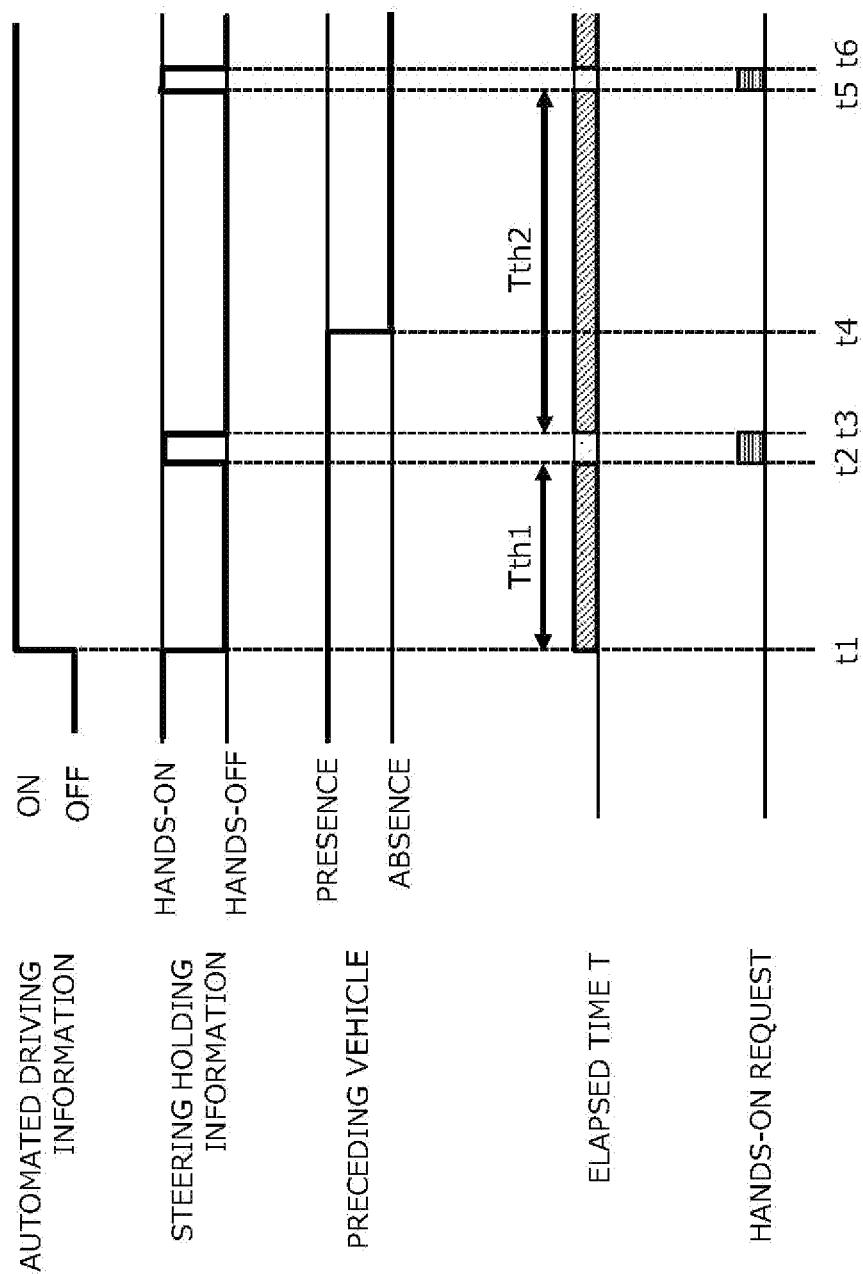
FIG. 10 is a timing chart for explaining an example of request notification control executed by the driver monitoring system according to the third embodiment.

FIG. 10 is a timing chart for explaining an example of request notification control executed by the driver monitoring system 10 according to the third embodiment. As shown in FIG. 10, when the hands-off automated driving is started at time t1, the request notification controller 34 calculates the elapsed time T from the time t1 of the hands-off automated driving. Then, when the elapsed time T exceeds a predetermined criterion time Tth1 at time t2, a hands-on request is notified to the drivers. The criterion time Tth1 here is a criterion time Tth used when the preceding vehicle of the vehicle 1 exists, and the criterion time Tth is 10 minutes for example. Thereafter, when continuous steering by the driver for a predetermined period of time, e.g., 4 seconds, is detected at time t3, the request notification controller 34 withdraws the hands-on request, resets the elapsed time T to zero, and calculates the elapsed time T from time t3.

On the other hand, after the time t4 when the preceding vehicle of the vehicle 1 does not exist, the criterion time Tth2 is used as the criterion time Tth. The criterion time Tth2 is longer than the criterion time Tth1, e.g., 20 minutes. In the case shown in FIG. 10, when the elapsed time T exceeds a predetermined criterion time Tth2 at time t5, the hands-on request is notified to the driver. Thereafter, when continuous steering by the driver for a predetermined period of time, e.g., 4 seconds, is detected at time t6, the request notification controller 34 withdraws the hands-on request and resets the elapsed time T to zero.

According to the request notification control as described above, it is possible to optimize the frequency at which the hands-on request is notified according to the surrounding environment during the hands-off automated driving.

3-3. Specific Process of Request Notification Control of Third Embodiment

Figure 11:
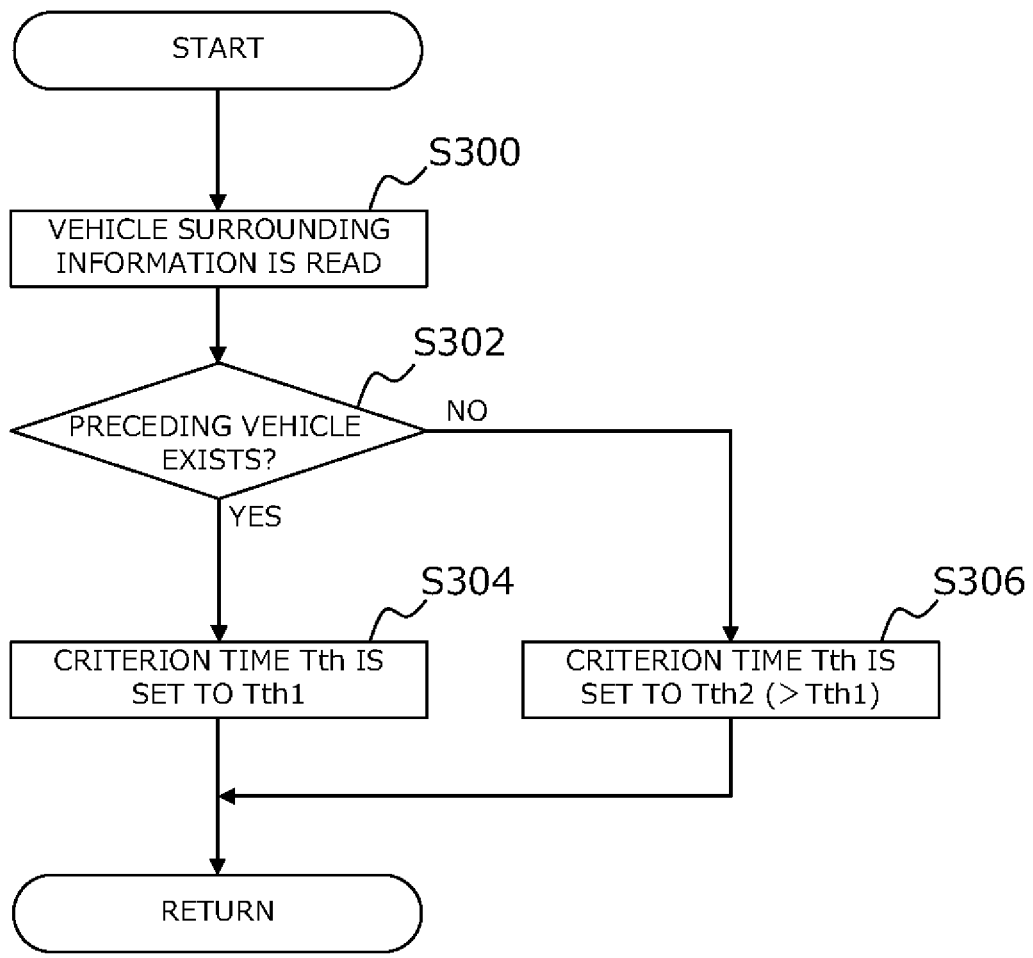
FIG. 11 is a flowchart showing a routine of criterion time setting control executed in the third embodiment.

Next, a specific process of the criterion time setting control executed in the driver monitoring system 10 according to the third embodiment having the above-described configuration will be described with reference to the flowchart. FIG. 11 is a flowchart showing a routine of the criterion time setting control executed in the third embodiment. The routine shown in FIG. 11 is repeatedly executed in the processor 36 of the request notification controller 34 at a predetermined control cycle, for example, 0.1 sec, during execution of the request notification control.

When the routine shown in FIG. 11 is started, first, in step S300, the vehicle surrounding information 384 stored in the memory 38 is read. In the next step S302, it is determined whether a preceding vehicle of the vehicle 1 exists based on the vehicle surrounding information 384. As a result, when there is a preceding vehicle, the process proceeds to step S304, and when there is no preceding vehicle, the process proceeds to step S306.

In step S304, the criterion time Tth is set to Tth1. On the other hand, in step S306, the criterion time Tth is set to a Tth2 larger than Tth1. When the process of step S304 or step S306 is completed, the routine is terminated.

The set criterion time Tth is read in the process of step S104 of the request notification control shown in FIG. 5. As a result, since the criterion time Tth in the request notification control is set to a different value depending on the presence or absence of the preceding vehicle, it is possible to optimize the notification frequency of the hands-on request.

3-4. Modified Example of Driver Monitoring System of Third Embodiment

When the criterion time Tth is set to Tth2 larger than Tth1 in the process of step S306, the driver may be notified that the time until the notification of the next hands-on request has been extended and the reason for the change of the hands-on request. Note that the method of notification is not limited. For example, the notification may be displayed on the HUD 68 or the MID 70, or the audio guidance may be output from the speaker 64. According to such a configuration, it is possible to solve the discomfort of the driver due to the notification interval is changed. This modification may be similarly applied to the systems of the fourth through sixth embodiments described later.

4. Fourth Embodiment

Next, the driver monitoring system according to the fourth embodiment will be described.

4-1. Configuration of Driver Monitoring System According to Fourth Embodiment

The configuration of the driver monitoring system according to the fourth embodiment is the same as that of the driver monitoring system 10 according to the first embodiment shown in FIG. 2. Therefore, a detailed description of the driver monitoring system according to the fourth embodiment is omitted.

4-2. Functions of Driver Monitoring System According to Fourth Embodiment

In the driver monitoring system 10 of the third embodiment described above, in the criterion time setting control, the criterion time Tth is set according to the information about the preceding vehicle of the vehicle 1, which is the vehicle surrounding information of the vehicle 1. In contrast, in the driver monitoring system 10 according to the fourth embodiment, in the criterion time setting control, the criterion time Tth is set according to the surrounding environment information obtained from VICS or the like.

Figure 12:
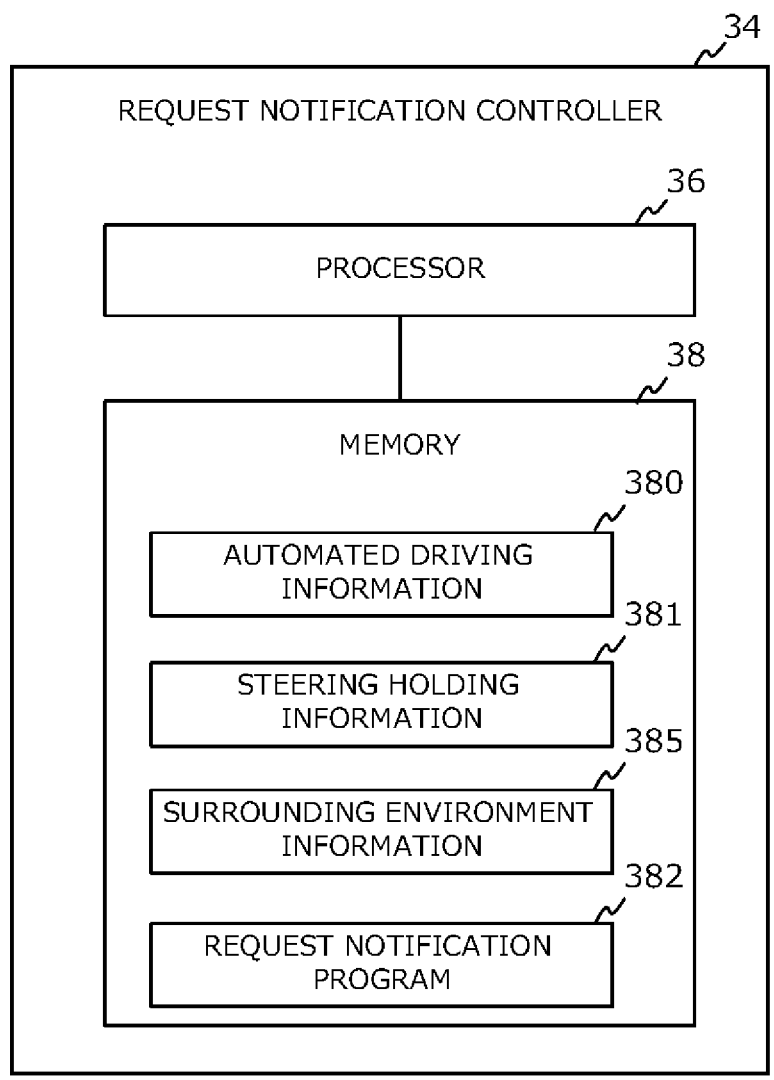
FIG. 12 is a block diagram showing a function of a request notification controller according to a fourth embodiment.

FIG. 12 is a block diagram showing a function of the request notification controller according to the fourth embodiment. The memory 38 of the request notification controller 34 according to the fourth embodiment stores surrounding environment information 385 in addition to the automated driving information 380, the steering holding information 381, and the request notification program 382 described above. The surrounding environment information 385 includes VICS information. The VICS information here is information obtained from the road-side machine via the communication device 16. Typically, the VICS information is, for example, construction information, traffic congestion information, branch guidance, weather information, regulation information due to accidents, faulty vehicles, disasters, or the like in the vicinity of the vehicle 1. The request notification program 382 includes a program related to the criterion time setting control. When the processor 36 executes the request notification program 382, the criterion time setting control is realized.

For example, when the VICS information includes the alert information to urge the drivers to pay attention, the request notification controller 34 shortens the criterion time Tth as compared with the case where the alert information is not included in the alert information. Typically, when regulation information due to adverse weather conditions, such as fog, thunderstorms, snow, etc., is included in the VICS information, the request notification controller 34 shortens the criterion time Tth than when the information is not included. Alternatively, when the construction information or the traffic congestion information or the like is included in the VICS information, the request notification controller 34 shortens the criterion time Tth than when the information is not included. According to such request notification control, it is possible to optimize the frequency at which the hands-on request is notified in accordance with the VICS information acquired during the automated hands-off operation.

4-3. Specific Process of Request Notification Control of Fourth Embodiment

Figure 13:
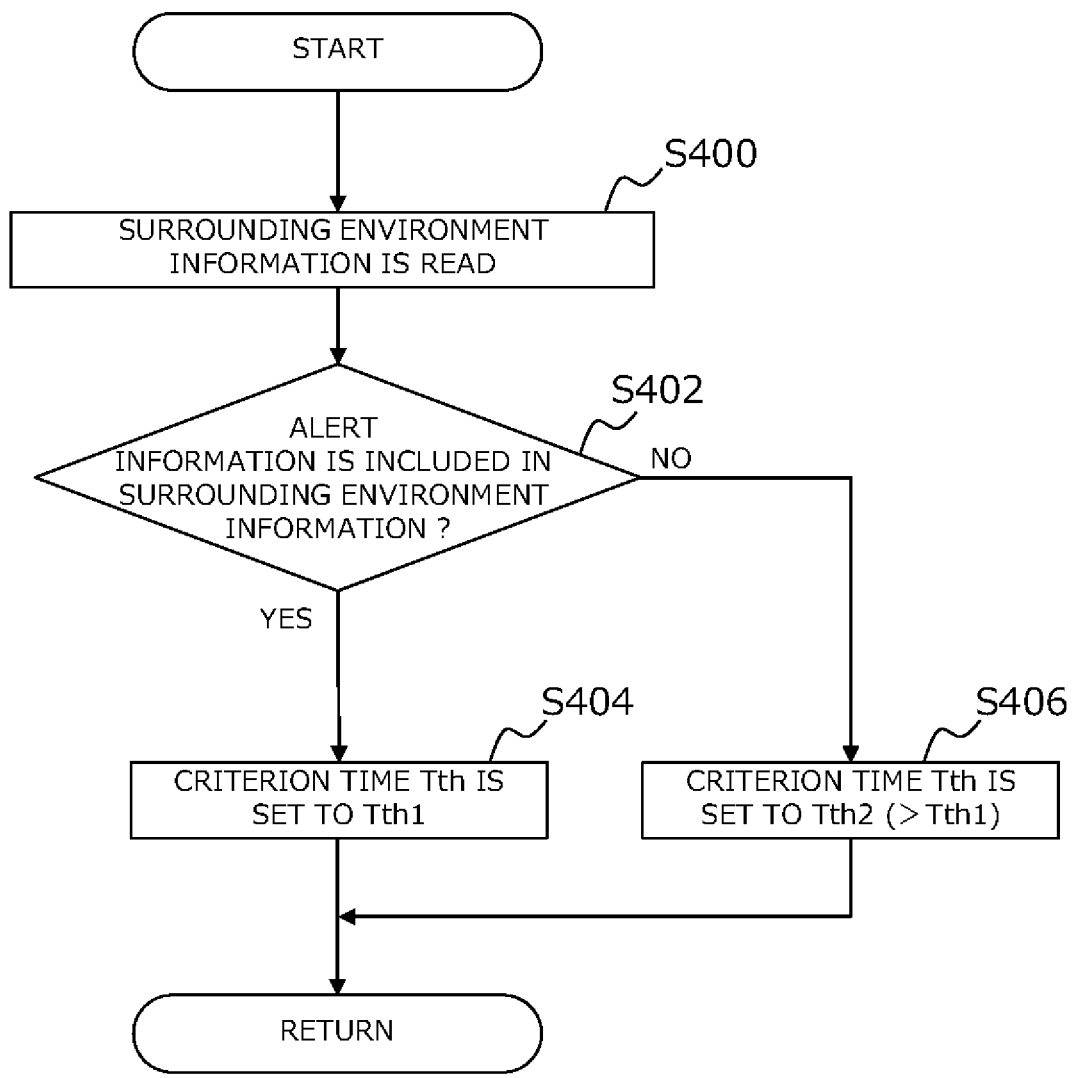
FIG. 13 is a flowchart showing a routine of criterion time setting control executed in the fourth embodiment.

Next, a specific process of the criterion time setting control executed in the driver monitoring system 10 according to the fourth embodiment having the above-described configuration will be described with reference to the flowchart. FIG. 13 is a flowchart showing a routine of the criterion time setting control executed in the fourth embodiment. The routine shown in FIG. 13 is repeatedly executed by the processor 36 of the request notification controller 34 in a predetermined control cycle, for example, 0.1 sec, during execution of the request notification control.

When the routine shown in FIG. 13 is started, first, in step S400, the surrounding environment information 385 stored in the memory 38 is read. In the next step S402, it is determined whether the alert information is included in the surrounding environment information 385. As a result, when the alert information is included in the surrounding environment information 385, the process proceeds to step S404, and when the alert information is not included, the process proceeds to step S406.

In step S404, the criterion time Tth is set to Tth1. On the other hand, in step S406, the criterion time Tth is set to Tth2 larger than Tth1. When the process of step S404 or step S406 is completed, the routine is terminated.

The set criterion time Tth is read in the process of step S104 of the request notification control shown in FIG. 5. As a result, since the criterion time Tth in the request notification control is set to different values according to the alert information obtained from VICS, the notification frequency of the hands-on request can be optimized.

5. Fifth Embodiment

Next, the driver monitoring system according to the fifth embodiment will be described.

5-1. Configuration of Driver Monitoring System According to Fifth Embodiment The configuration of the driver monitoring system according to the fifth embodiment is the same as that of the driver monitoring system 10 according to the first embodiment shown in FIG. 2. Therefore, a detailed description of the driver monitoring system according to the fifth embodiment is omitted.

5-2. Functions of Driver Monitoring System According to Fifth Embodiment

In the driver monitoring system 10 of the third embodiment described above, in the criterion time setting control, the criterion time Tth is set according to the information about the preceding vehicle of the vehicle 1, which is the vehicle surrounding information of the vehicle 1. In contrast, in the driver monitoring system 10 according to the fifth embodiment, in the criterion time setting control, the criterion time Tth is set according to map information held by the navigation device 18.

Figure 14:
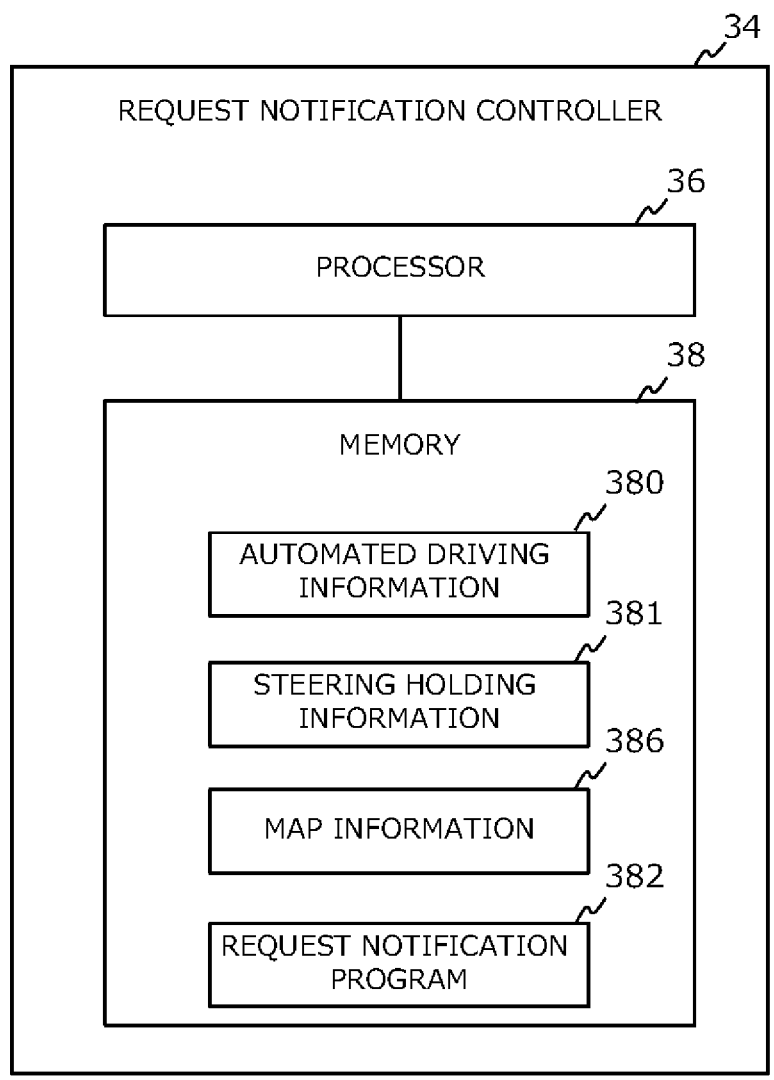
FIG. 14 is a block diagram showing a function of the request notification controller according to a fifth embodiment.

FIG. 14 is a block diagram showing a function of the request notification controller according to the fifth embodiment. The memory 38 of the request notification controller 34 according to the fifth embodiment stores map information 386 in addition to the automated driving information 380, the steering holding information 381, and the request notification program 382 described above. The map information 386 includes information relating to an alert section. The alert section is a section where the driver is urged to pay attention. Examples of such an alert section include an accident-prone sections where accidents occur frequently, and sections with a series of curves. The request notification program 382 includes a program related to the criterion time setting control. When the processor 36 executes the request notification program 382, the criterion time setting control is realized.

For example, when the current position of the vehicle 1 belongs to the alert section, the request notification controller 34 shortens the criterion time Tth compared to when the current position does not belong to the alert section. According to such request notification control, it is possible to optimize the frequency at which the hands-on request is notified according to the terrain or the road shape during the hands-off automated driving.

5-3. Specific Process of Request Notification Control of Fifth Embodiment

Figure 15:
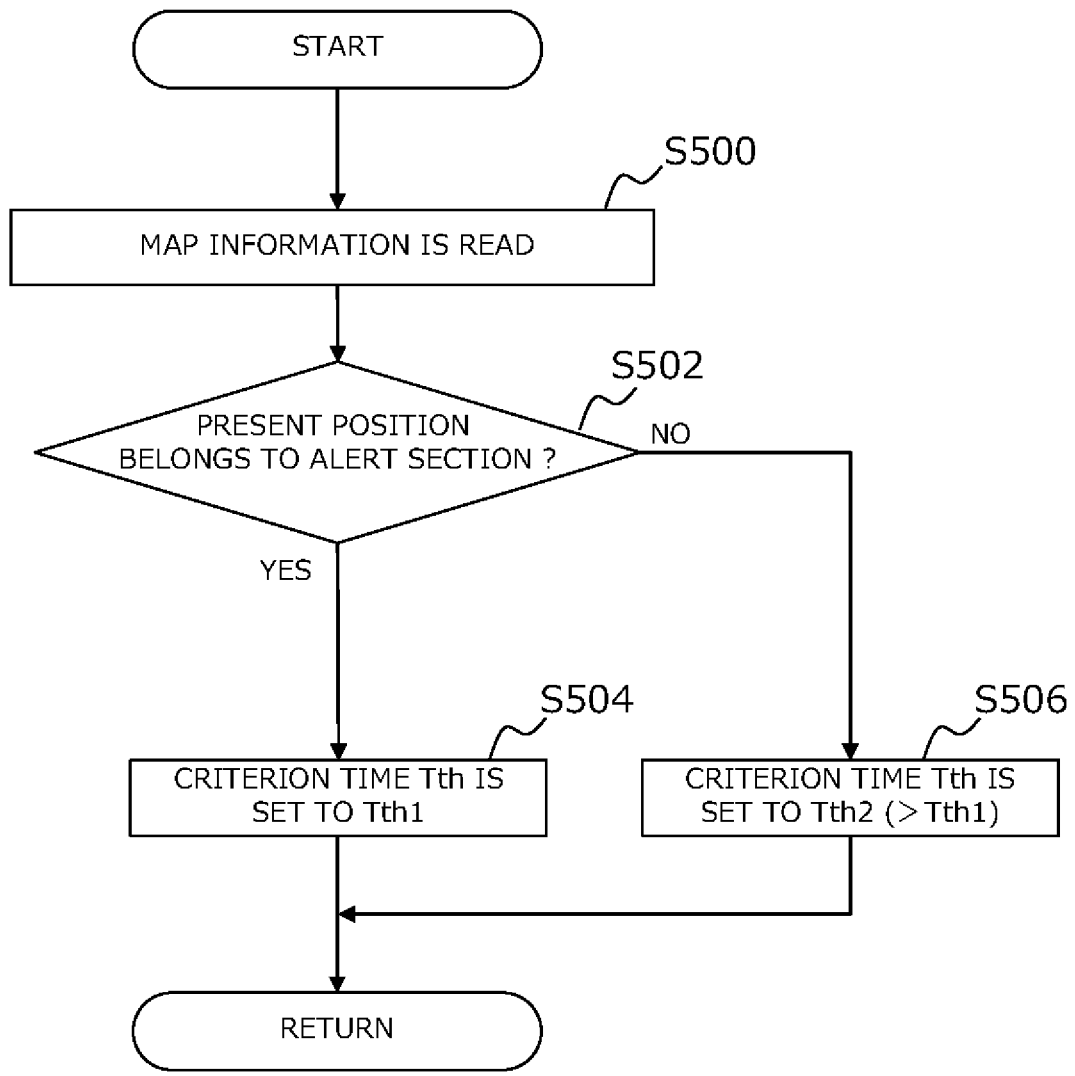
FIG. 15 is a flowchart showing a routine of criterion time setting control executed in the fifth embodiment.

Next, a specific process of the criterion time setting control executed in the driver monitoring system 10 according to the fifth embodiment having the above-described configuration will be described with reference to the flowchart. FIG. 15 is a flowchart showing a routine of the criterion time setting control executed in the fifth embodiment. The routine shown in FIG. 15 is repeatedly executed by the processor 36 of the request notification controller 34 in a predetermined control cycle, for example, 0.1 sec, during execution of the request notification control.

When the routine shown in FIG. 15 is started, first, in step S500, the map information 386 stored in the memory 38 is read. In the next step S502, it is determined whether the present position of the vehicle 1 belongs to the alert section based on the map information 386. As a result, when the current position of the vehicle 1 belongs to the alert section, the process proceeds to step S504, and when the current position does not belong to the alert section, the process proceeds to step S506.

In step S504, the criterion time Tth is set to Tth1. On the other hand, in step S506, the criterion time Tth is set to Tth2 larger than Tth1. When the process of step S504 or step S506 is completed, the routine is terminated.

The set criterion time Tth is read in the process of step S104 of the request notification control shown in FIG. 5. As a result, since the criterion time Tth in the request notification control is set to a different value according to the driving section of the vehicle 1, it is possible to optimize the notification frequency of the hands-on request.

6. Sixth Embodiment

Next, the driver monitoring system according to the sixth embodiment will be described.

6-1. Configuration of Driver Monitoring System According to Sixth Embodiment The configuration of the driver monitoring system according to the sixth embodiment is the same as that of the driver monitoring system 10 according to the first embodiment shown in FIG. 2. Therefore, a detailed description of the driver monitoring system according to the sixth embodiment is omitted.

6-2. Functions of Driver Monitoring System According to Sixth Embodiment

In the driver monitoring system 10 of the third embodiment described above, in the criterion time setting control, the criterion time Tth is set according to the information about the preceding vehicle of the vehicle 1, which is the vehicle surrounding information of the vehicle 1. In contrast, in the driver monitoring system 10 according to the sixth embodiment, in the criterion time setting control, the criterion time Tth is set according to the presence or absence of a warning to the driver.

The automated driving controller 32 performs driver warning control for providing a warning to the driver when it detects a sign that the driver's attention to driving of the vehicle 1 is lowered due to a factor such as drowsiness during the automated driving of the vehicle 1. The driver's attention is determined based on, for example, the driver's line of sight, heartbeat state, breathing state, and the like, which are detected by the driver monitor 22. In the driver warning control, the automated driving controller 32 detects signs of a decrease in attention based on the comparative between the detected indicators and a predetermined determination threshold, and provides a warning to the driver. The warnings are exemplified here, for example, a warning indication to the HUD 68 or the MID 70, an output of a warning sound from the speaker 64, a vibration operation of a driver seat, a tightening operation of a seat belt, and the like. The driver warning control may be a known control for performing a warning based on the degree of awakening of the driver, and therefore a detailed description thereof is omitted here. The execution state of the warning to the driver by the driver warning control is stored in the memory of the automated driving controller 32 as driver warning information.

Figure 16:
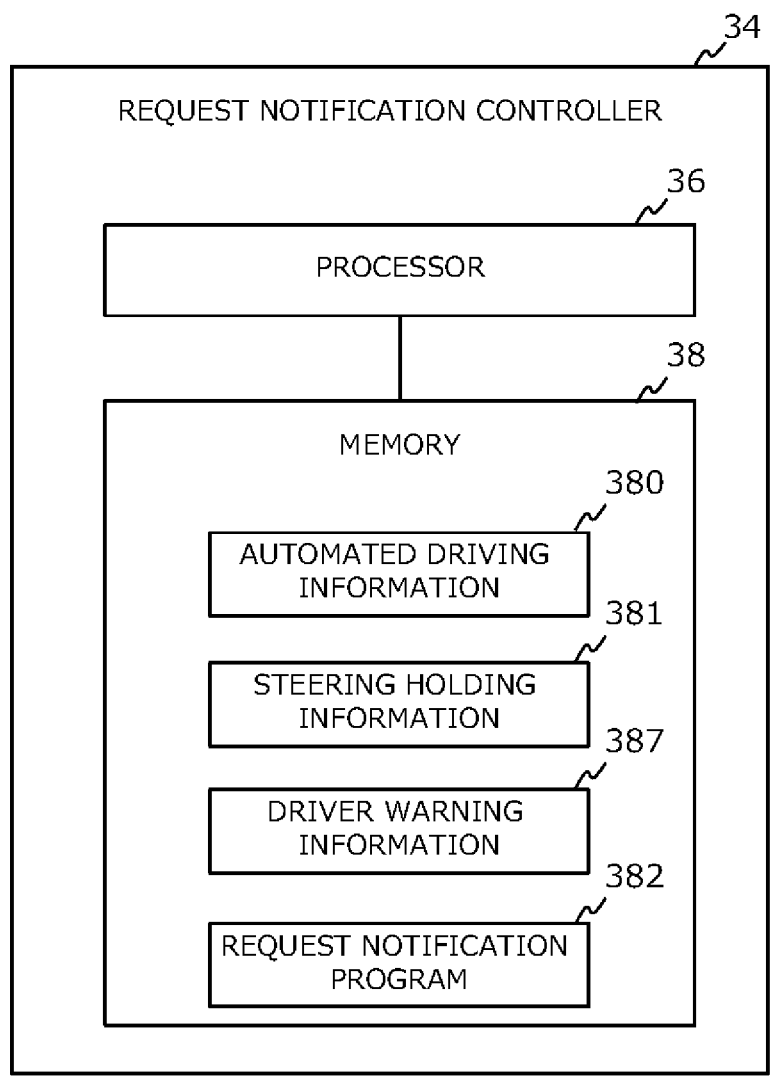
FIG. 16 is a block diagram showing the function of a request notification controller according to a sixth embodiment.

FIG. 16 is a block diagram showing the function of the request notification controller according to the sixth embodiment. The memory 38 of the request notification controller 34 according to the sixth embodiment stores driver warning information 387 obtained from the automated driving controller 32 in addition to the automated driving information 380, the steering holding information 381, and the request notification program 382 described above. The request notification program 382 includes a program related to the criterion time setting control. When the processor 36 executes the request notification program 382, the criterion time setting control is realized.

Even if the driver is warned by the driver warning control described above, the driver is not always completely awake. Therefore, in the criterion time setting control of the sixth embodiment, when the warning by the driver warning control is performed during the hands-off automated driving, the criterion time Tth is shortened than when the warning is not performed. According to the request notification control, it is possible to increase the notification frequency of the hands-on request when there is a possibility that the driver's attention is lowered during the hands-off automated driving.

6-3. Specific Process of Request Notification Control of Sixth Embodiment

Figure 17:
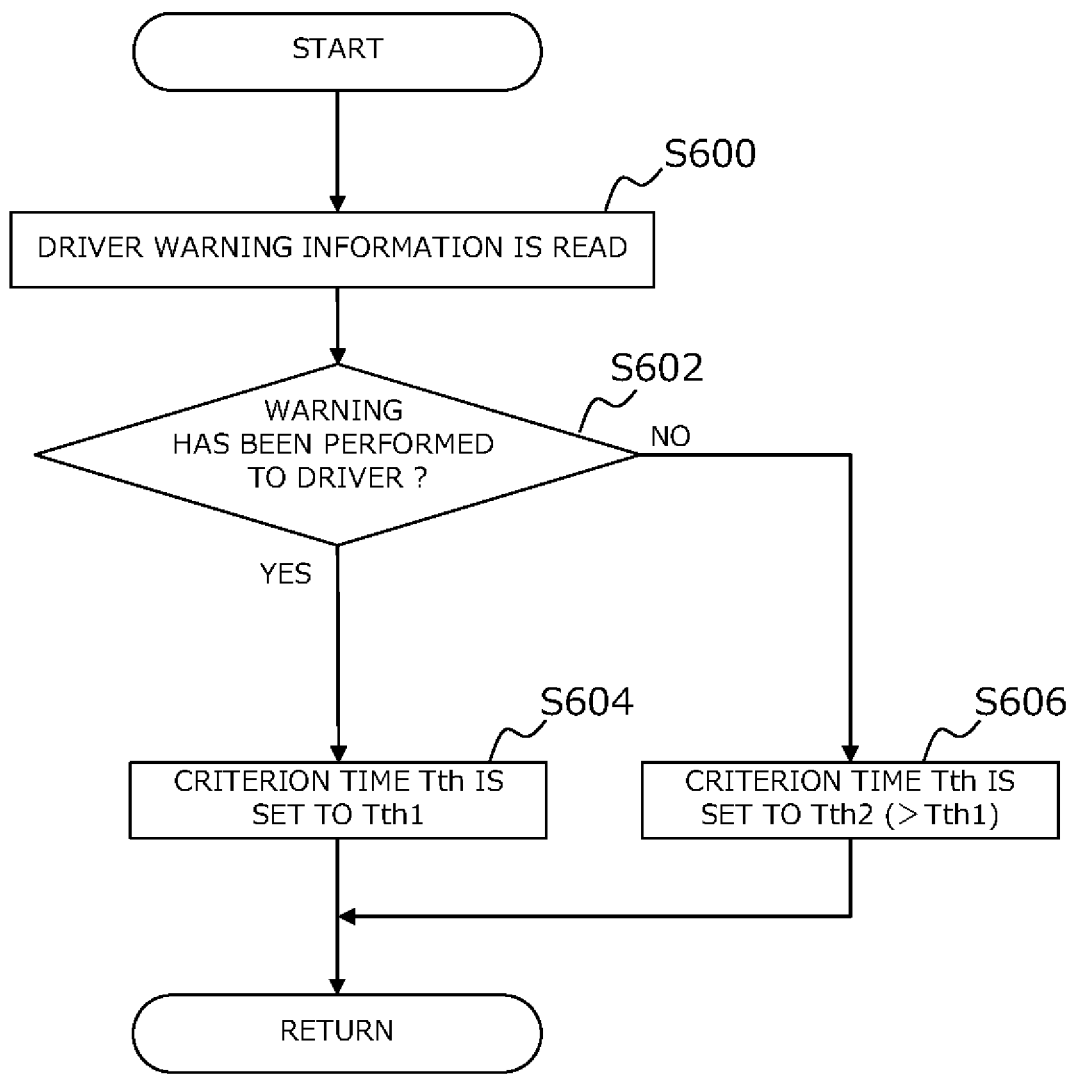
FIG. 17 is a flowchart showing a routine of criterion time setting control executed in the sixth embodiment.

Next, a specific process of the criterion time setting control executed in the driver monitoring system 10 according to the sixth embodiment having the above-described configuration will be described with reference to the flowchart. FIG. 17 is a flowchart showing a routine of the criterion time setting control executed in the sixth embodiment. The routine shown in FIG. 17 is repeatedly executed by the processor 36 of the request notification controller 34 in a predetermined control cycle, for example, 0.1 sec, during execution of the request notification control.

When the routine shown in FIG. 17 is started, first, in step S600, the driver warning information 387 stored in the memory 38 is read. In the next step S602, it is determined whether a warning has been performed to the driver during the period from the last hands-on request based on the driver warning information 387. As a result, when the warning to the driver has been performed, the process proceeds to step S604, and when the warning to the driver has not been performed, the process proceeds to step S606.

In step S604, the criterion time Tth is set to Tth1 (e.g., 10 minutes). On the other hand, in step S606, the criterion time Tth is set to Tth2 larger than Tth1 (e.g., 20 minutes). When the process of step S604 or step S606 is completed, the routine is terminated.

The set criterion time Tth is read in the process of step S104 of the request notification control shown in FIG. 5. As a result, the criterion time Tth in the request notification control is set to a different value according to the presence or absence of the warning to the driver, and therefore, the notification frequency of the hands-on request can be optimized.

What is claimed is:

1. A driver monitoring system comprising:
   an automated driving controller that allows hands-off operation in which a driver releases hands from a steering wheel of a vehicle, and controls an automated steering driving in which the vehicle is automatically steered; and
   a request notification controller that notifies a hands-on request for prompting the driver of the vehicle to perform a hands-on operation to hold the steering wheel, or a surrounding confirmation request for prompting the driver to perform a surrounding confirmation operation to confirm a surrounding condition,
   wherein during the automated steering driving, the request notification controller is configured to notify the hands-on request or the surrounding confirmation request again when an elapsed time from notification of the hands-on request or the surrounding confirmation request exceeds a criterion time;
   further comprising information acquisition equipment to acquire vehicle surrounding information of the vehicle,
   wherein during the automated steering driving, the request notification controller is configured to execute criterion time setting control for setting the criterion time in accordance with the vehicle surrounding information detected by the information acquisition equipment;
   wherein the vehicle surrounding information includes information about a preceding vehicle of the vehicle, and
   wherein, in the determination reference time setting control, the request notification controller is configured to set the criterion time longer when the preceding vehicle exists than when the preceding vehicle does not exist.

2. The driver monitoring system according to claim 1, further comprising a steering touch sensor for detecting a steering information of the steering wheel,
   wherein during the automated steering driving, the request notification controller is configured to reset the elapsed time when an execution of the hands-on operation is determined based on the steering information.

3. The driver monitoring system according to claim 1, further comprising a driver monitor for monitoring a status of the driver of the vehicle,
   wherein during the automated steering driving, the request notification controller is configured to reset the elapsed time when an execution of the surrounding confirmation operation is determined based on the driver monitor information obtained from the driver monitor.

4. The driver monitoring system according to claim 1,
   wherein the vehicle surrounding information includes surrounding environment information transmitted from a road-side machine, and
   wherein in the criterion time setting control, the request notification controller is configured to set the criterion time to be longer when the surrounding environment information includes alert information to urge the driver to pay attention.

5. The driver monitoring system according to claim 1,
   wherein the vehicle surrounding information includes map information, wherein the map information includes information relating to an alert section to urge the driver to pay attention, and wherein in the criterion time setting control, the request notification controller is configured to set the criterion time to be longer when the current position of the vehicle belongs to the alert section than when the current position does not belong to the alert section.

6. The driver monitoring system according to claim 1, wherein the automated driving controller is configured to execute a driver warning control for providing a warning to the driver when an indication related to a decrease in a driver's attention is detected, and wherein in the criterion time setting control, when the warning is performed by the driver warning control, the request notification controller is configured to set the criterion time to be shorter than before the warning is performed.

7. The driver monitoring system according to claim 1, wherein in the criterion time setting control, the request notification controller is configured to notify the driver of a reason for change when the criterion time is changed.

8. A driver monitoring method applied to a vehicle, the vehicle comprising an automated driving controller that allows hands-off operation in which a driver releases hands from a steering wheel of the vehicle, and controls an automated steering driving in which the vehicle is automatically steered, and a request notification controller that notifies a hands-on request for prompting the driver of the vehicle to perform a hands-on operation to hold the steering wheel, or a surrounding confirmation request for prompting the driver to perform a surrounding confirmation operation to confirm a surrounding condition, the driver monitoring method comprising a process of, during the automated steering driving, notifying the hands-on request or the surrounding confirmation request again when an elapsed time from notification of the hands-on request or the surrounding confirmation request exceeds a criterion time;

acquiring vehicle surrounding information of the vehicle, during the automated steering driving, executing criterion time setting control for setting the criterion time in accordance with the vehicle surrounding information;

wherein the vehicle surrounding information includes information about a preceding vehicle of the vehicle, and setting the criterion time longer when the preceding vehicle exists than when the preceding vehicle does not exist.

* * * * *